US009303579B2

United States Patent
Swoish et al.

(10) Patent No.: US 9,303,579 B2
(45) Date of Patent: Apr. 5, 2016

(54) SYSTEM AND METHOD FOR MONITORING A PARTICULATE FILTER IN A VEHICLE EXHAUST AFTERTREATMENT DEVICE

(75) Inventors: Christopher C. Swoish, Lapeer, MI (US); Christopher Whitt, Howell, MI (US); Douglas Christopher Sarsen, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 596 days.

(21) Appl. No.: 13/563,848

(22) Filed: Aug. 1, 2012

(65) Prior Publication Data

US 2014/0033680 A1    Feb. 6, 2014

(51) Int. Cl.
| | |
|---|---|
| *F01N 3/00* | (2006.01) |
| *F02D 41/14* | (2006.01) |
| *F02D 41/02* | (2006.01) |
| *F01N 9/00* | (2006.01) |
| *F01N 11/00* | (2006.01) |

(52) U.S. Cl.
CPC ............ *F02D 41/1445* (2013.01); *F01N 9/002* (2013.01); *F01N 11/002* (2013.01); *F02D 41/029* (2013.01); *F02D 41/1448* (2013.01); *F02D 2200/0812* (2013.01); *Y02T 10/47* (2013.01)

(58) Field of Classification Search
CPC ........... F01N 11/00; F01N 3/023; F01N 9/00; F01N 3/00
USPC ............................................ 60/277, 297, 295
See application file for complete search history.

(56) References Cited

U.S. PATENT DOCUMENTS

| | | | | |
|---|---|---|---|---|
| 8,402,943 | B2 * | 3/2013 | Ruhland et al. | 123/406.44 |
| 2003/0230075 | A1 | 12/2003 | Saito et al. | |
| 2004/0260452 | A1 * | 12/2004 | Hamahata | 701/108 |
| 2007/0251214 | A1 * | 11/2007 | Nishino | F01N 11/00 60/277 |
| 2009/0084097 | A1 * | 4/2009 | Sato et al. | 60/311 |
| 2010/0126145 | A1 * | 5/2010 | He et al. | 60/286 |
| 2010/0319319 | A1 * | 12/2010 | Ide | 60/277 |

FOREIGN PATENT DOCUMENTS

JP          0465698 A      3/1992

* cited by examiner

*Primary Examiner* — Kenneth Bomberg
*Assistant Examiner* — Anthony Ayala Delgado
(74) *Attorney, Agent, or Firm* — Quinn Law Group, PLLC

(57) ABSTRACT

A method of monitoring a particulate filter of an exhaust aftertreatment device includes sensing a first pressure drop across the particulate filter at a first instant in time, and sensing a second pressure drop across the particulate filter at a second instant in time. A controller may then calculate a rate-of-change of the pressure drop between the first instant in time and the second instant in time while sensing a flow rate of an exhaust gas flowing through the exhaust aftertreatment device. Using the sensed exhaust flow rate, the controller may determine a rate-of-change threshold, and subsequently compare the calculated rate-of-change to the rate-of-change threshold. The method further includes updating a soot model using the sensed second pressure drop if the calculated rate-of-change is less than the rate-of-change threshold.

11 Claims, 2 Drawing Sheets

SYSTEM AND METHOD FOR MONITORING A PARTICULATE FILTER IN A VEHICLE EXHAUST AFTERTREATMENT DEVICE

TECHNICAL FIELD

The present invention relates to a method of monitoring a particulate filter in an exhaust gas aftertreatment system using a differential pressure module.

BACKGROUND

Various exhaust after-treatment devices, such as particulate filters and other devices, have been developed to effectively limit exhaust emissions from internal combustion engines. In the case of compression-ignition or diesel engines, a great deal of effort continues to be expended to develop practical and efficient devices and methods to reduce emissions of largely carbonaceous particulates otherwise present in the engine's exhaust gas.

An after-treatment system for a modern diesel engine exhaust typically incorporates a diesel particulate filter (DPF) for collecting and disposing of the sooty particulate matter emitted by the diesel engine prior to the exhaust gas being discharged to the atmosphere. A typical DPF acts as a trap for removing the particulate matter from the exhaust stream. The DPF may contain precious metals, such as platinum and/or palladium, which serve as catalysts to further oxidize soot and hydrocarbons present in the exhaust stream. In many instances, the DPF may be regenerated or cleaned using superheated exhaust gas to burn off the collected particulate.

SUMMARY

A vehicle may include an engine and an exhaust aftertreatment device in fluid communication with the engine. The exhaust aftertreatment device may include a particulate filter for separating soot from combustion gasses exhausted from the engine.

A system for monitoring the particulate filter of the exhaust aftertreatment device includes a first fluid tube, a second fluid tube, a differential pressure module and a controller. The first fluid tube may be disposed in fluid communication with the exhaust aftertreatment device between the particulate filter and the engine. The second fluid tube may be disposed in fluid communication with the exhaust aftertreatment device and on an opposite side of the particulate filter from the first fluid tube. As such, the first fluid tube may be "upstream" of the particulate filter, and the second fluid tube may be "downstream" of the particulate filter.

A differential pressure module may be in communication with a controller, and may be configured to monitor a pressure drop between the first fluid tube and the second fluid tube. The controller may be configured to sense a first pressure drop across the particulate filter at a first instant in time, and sense a second pressure drop across the particulate filter at a second instant in time. It may then calculate a rate-of-change of the pressure drop between the first instant in time and the second instant in time, while sensing a flow rate of an exhaust gas flowing through the exhaust aftertreatment device. The controller may use the sensed flow rate to determine a rate-of-change threshold, and may then compare the calculated rate-of-change to the rate-of-change threshold. If the calculated rate-of-change is less than the rate-of-change threshold, the controller may update a soot model using the sensed second pressure drop.

Likewise, a method of monitoring a particulate filter of an exhaust aftertreatment device includes sensing a first pressure drop across the particulate filter at a first instant in time, and sensing a second pressure drop across the particulate filter at a second instant in time. A controller may then calculate a rate-of-change of the pressure drop between the first instant in time and the second instant in time while sensing a flow rate of an exhaust gas flowing through the exhaust aftertreatment device. Using the sensed exhaust flow rate, the controller may determine a rate-of-change threshold, and subsequently compare the calculated rate-of-change to the rate-of-change threshold. The method further includes updating a soot model using the sensed second pressure drop if the calculated rate-of-change is less than the rate-of-change threshold.

The above features and advantages and other features and advantages of the present invention are readily apparent from the following detailed description of the best modes for carrying out the invention when taken in connection with the accompanying drawings.

DETAILED DESCRIPTION

Figure 1:
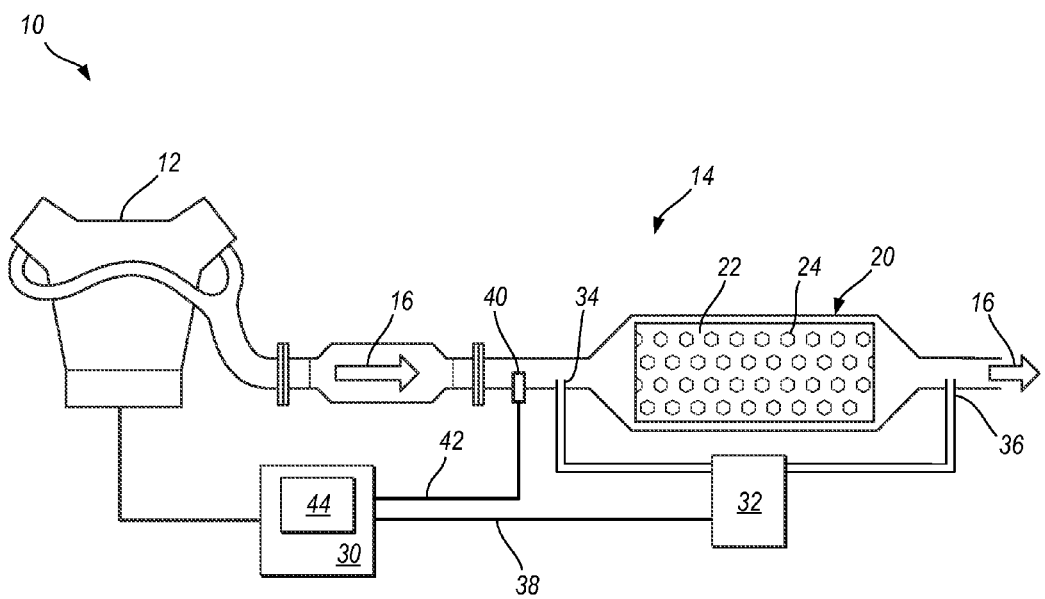
FIG. 1 is a schematic diagram of an engine and an exhaust gas aftertreatment system for treating exhaust gas from the engine.

Referring to the drawings, wherein like reference numerals are used to identify like or identical components in the various views, FIG. 1 schematically illustrates a vehicle 10, including an engine 12 and an exhaust gas aftertreatment system 14. As may be appreciated, the engine 12 may combust a mixture of fuel and air to provide a motive force for the vehicle 10. The exhaust gas aftertreatment system 14 may then direct and treat the byproducts of the combustion (i.e., exhaust gasses) as they flow from the engine 12 (indicated by flow arrows 16). In general, the exhaust gas aftertreatment system 14 may remove suspended particulate matter and NOx gasses from the exhaust flow 16 prior to the gas being expelled from the vehicle 10. In one configuration, the engine 12 may be a compression-ignited diesel engine; however, other types of engine technology may similarly be used.

The exhaust gas aftertreatment system 14 may generally include a particulate filter 20 that may be configured to filter the particulate matter, i.e., soot, from the exhaust gas of the engine 12. The particulate filter 20 may include one or more substrates 22 that define a plurality of apertures 24, through which the exhaust gas must flow. As the exhaust gas passes through the particulate filter 20, suspended airborne particulate matter may collect on the substrates 22, where it may be separated from the flow 16.

Over the life of the vehicle 10, the particulate filter 20 may occasionally need to be regenerated to remove any collected particulate matter. In one configuration, regeneration of the particulate filter 20 may include heating the particulate filter 20 to a temperature sufficient to burn the particulate matter off of the substrate 22. This high temperature may then be maintained for a period of time sufficient to burn off a majority of the particulate matter from the substrate 22. In general, the process of "burning off" the particulate matter may involve converting the trapped particulate matter into carbon dioxide, which may be more permissibly dissipated into the atmosphere.

To determine when a particulate filter 20 regeneration event is required, a controller 30 may monitor an exhaust flow impedance of the particulate filter 20 via a differential pressure sensor module 32 disposed across the particulate filter 20. The differential pressure sensor module 32 may monitor a pressure drop across the substrate 22 by comparing the pressure within a first fluid tube 34 in fluid communication with the exhaust gas aftertreatment system 14 upstream of the filter 20 (i.e., between the filter 20 and the engine 12) against the pressure within a second fluid tube 36 in fluid communication with the aftertreatment system 14 downstream of the filter 20 (i.e., on an opposite side of the particulate filter 20 from the first fluid tube 34). Alternatively, one or both of the fluid tubes 34, 36 may be replaced with electronic pressure sensors, which may be in respective fluid communication with the exhaust flow 16. Such electronic pressure sensors may include, for example, piezoresistive sensors, piezoelectric sensors, MEMS sensors, and/or capacitive sensors that may be configured to convert a sensed pressure into an analog or digital signal representative of the sensed pressure. The differential pressure module 32 may detect a pressure drop between the respective first and second fluid tubes 34, 36, and may provide a signal 38 (i.e., the delta pressure signal 38) to the controller 30 that is indicative of the magnitude of the difference.

In addition to the differential pressure module 32, the aftertreatment system 14 may also include a flow rate sensor 40. The flow rate sensor 40 may be configured to provide the controller 30 with a signal 42 that is indicative of the speed of the exhaust gas flow 16 through the exhaust system. In one configuration, the flow rate sensor 40 may be a physical sensor disposed in the exhaust flow 16 stream, and may include, for example, a mass airflow sensor, a strain gauge, an impeller, or some other type of physical flow sensor. In another configuration, the flow rate sensor 40 may infer flow rate through a mass airflow sensor associated with the air intake of the engine 12, exhaust gas recirculation sensors/actuators, and/or other related/sensed parameters.

In general, the controller 30 may use the sensed difference in pressure from the differential pressure module 32, as well as the exhaust gas flow rate, as inputs into a soot model 44, which may estimate the status of the particulate filter 20. In one configuration, the soot model 44 may use the sensed pressure drop across the particulate filter to estimate the number of grams of soot collected within the particulate filter 20.

When the soot model 44 estimates that the particulate filter 20 requires regeneration (i.e., a determined amount of soot exceeds a soot threshold), the controller 30 may then adjust the operation of the engine 12 to perform the regeneration. In one configuration, the controller 30 may initiate a filter regeneration event by increasing the amount of fuel provided to the engine so that the fuel/air ratio is slightly rich of a stoichiometric balance.

The controller 30 may include a computer and/or processor, and include all software, hardware, memory, algorithms, connections, sensors, etc., necessary to monitor and control the exhaust gas aftertreatment system 14, engine 12, and/or the differential pressure module 32. As such, a control method operative to evaluate the soot model 44 and/or to initiate a regeneration may be embodied as software or firmware associated with the controller 30. It should be appreciated that the controller 30 may also include any device capable of analyzing data from various sensors, comparing data, making the necessary decisions required to control the exhaust gas aftertreatment system 14, as well as monitoring the differential pressure module 32.

Due to the dynamics of the engine and the driving habits of the driver, the delta pressure signal 38 may fluctuate across different driving conditions. As an internal validation of the pressure readings, the controller 30 may examine the rate-of-change in the delta pressure signal 38 over short periods of time (i.e., 0.5-60 seconds). It has been found that large variations in the delta pressure signal 38 over short periods of time more closely correlate with the driving habits of the driver than with the status of the particulate filter 20.

In one configuration, a noise threshold may be implemented by the controller 30 such that a sensed pressure drop across the particulate filter 20 may only be updated within the soot model 44 if the pressure drop is relatively stable. In one configuration, the pressure drop may be considered "relatively stable" if a rate-of-change in the pressure signal 38 is below the noise threshold. Said another way, the controller may continuously monitor the differential pressure signal to determine the rate-of-change from previous readings. If the rate-of-change is above the threshold, the controller 30 may disregard the pressure updates as being unreliable.

While a static noise/rate-of-change threshold may provide one manner of rejecting inaccurate readings, it may prove difficult to select a single threshold value that properly filters readings across the full range of engine dynamics. For example, it has been found that the magnitude of noise/fluctuation may be greater at higher exhaust gas flow rates than at comparatively lower flow rates. In this manner, setting a low rate-of-change threshold may be properly restrictive at low flow rates, though may reject an unduly large number of otherwise valid readings at high flow rates. Conversely, a high threshold may be properly restrictive at high flow rates, though may accept readings at lower flow rates that are riddled with noise.

Figure 2:
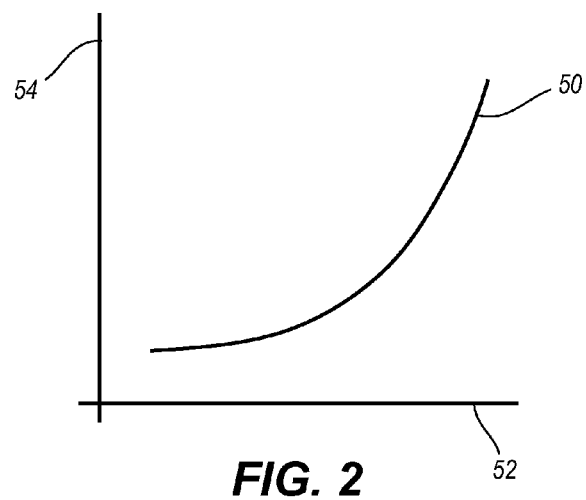
FIG. 2 is a schematic graph of a pressure rate-of-change threshold as a function of exhaust gas flow rate.

Therefore, in another configuration, the rate-of-change threshold may be a function of the sensed exhaust gas flow rate. In this manner, larger short-term pressure fluctuations may be permitted at higher exhaust gas flow rates than at lower exhaust gas flow rates. In one embodiment, as shown in FIG. 2, the rate-of-change threshold 50 may increase exponentially as a function of sensed exhaust gas flow rate 52 (with the vertical axis representing the rate of pressure change 54). In another embodiment, the rate-of-change threshold 50 may increase linearly as a function of sensed exhaust gas flow rate 52. In still another embodiment, the rate-of-change threshold 50 may increase as a logarithmic or piecewise function of sensed exhaust gas flow rate 52. For quick reference, the rate-of-change threshold 50 may be stored in the controller 30 as a look-up table, wherein a plurality of rate-of-change threshold values may be recorded as a function of the sensed exhaust gas flow rate 52.

Figure 3:
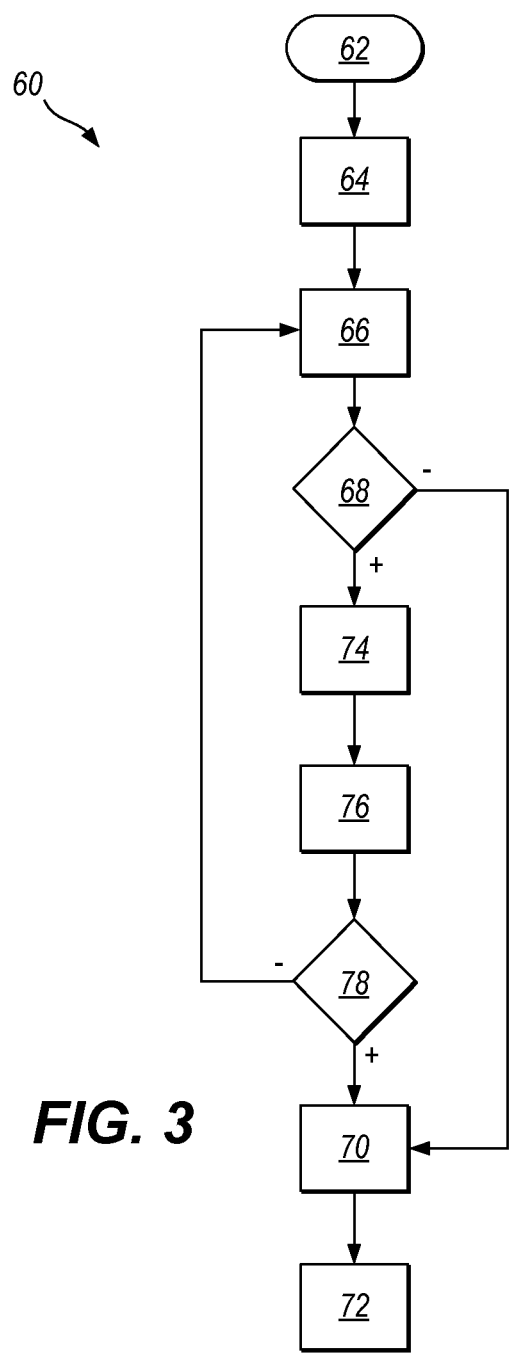
FIG. 3 is a schematic flow diagram of a method of monitoring a particulate filter of an exhaust aftertreatment device.

FIG. 3 generally illustrates a method 60 of monitoring the status of a particulate filter 20 using a differential pressure module 32. The method 60 begins at step 62, such as immediately following a key-on event of the combustion engine 12. In step 64, the controller 30 may poll the differential pressure module 32 to record a first, baseline pressure reading at a first instant in time T1. In step 66, after a predetermined period of time from T1, the controller 30 may again poll the differential pressure module 32 to record a second pressure reading (i.e. at a second instant in time T2, where T1 precedes T2). In step 68, the controller 30 may compare the second pressure reading with the first pressure reading to determine if the pressure across the particulate filter has changed. If there is no difference in the two readings (and/or the difference is within a pre-established margin of error of the sensing device), the second reading may be provided to a soot evaluation model in step 70. The first, baseline pressure reading may then be overwritten with the second reading in step 72.

If a variation is detected between the first and second pressure readings in step 68, the controller 30 may then poll the exhaust gas flow rate in step 74, look up the rate-of-change threshold 50 for that sensed flow rate in step 76 (e.g., from a look-up table associated with the controller), and compare the magnitude of the variation to the rate-of-change threshold 50 in step 78. If the magnitude of the variation is below the threshold level, the second reading may be passed to the soot evaluation model in step 70 and the first, baseline pressure reading may be overwritten with the second reading in step 72. If the magnitude of the variation is above the threshold level in step 78, the controller 30 may reject the second reading and/or re-poll the differential pressure module 32 in step 66 after a predetermined period of time.

In one configuration, if a pressure reading is rejected, the controller 30 may estimate the incremental accumulation of soot within the particulate filter using the combustion parameters of the engine (i.e., mass air flow, exhaust gas recirculation, and/or fuel mass). Alternatively, the estimate of accumulated soot within the particulate filter may be held constant until a subsequent pressure reading may be acquired and validated.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of regenerating a particulate filter of an exhaust aftertreatment device comprising:
   sensing a first pressure drop across the particulate filter at a first instant in time via a pressure sensor;
   sensing a second pressure drop across the particulate filter at a second instant in time via the pressure sensor, wherein the first instant in time and the second instant in time are from 0.5 to 60 seconds apart;
   calculating a rate-of-change of the pressure drop between the first instant in time and the second instant in time using a controller in communication with the pressure sensor;
   sensing a flow rate of an exhaust gas flowing through the exhaust aftertreatment device;
   determining a rate-of-change threshold from the sensed exhaust flow rate;
   comparing the calculated rate-of-change to the rate-of-change threshold;
   updating a soot model maintained by the controller using the sensed second pressure drop if the calculated rate-of-change is less than the rate-of-change threshold; and
   regenerating the particulate filter when an amount of soot, as determined by the soot model, exceeds a soot threshold, wherein the regenerating includes burning the soot off the particulate filter by heating the particulate filter via increasing an amount of fuel provided to an engine coupled.

2. The method of claim 1, further comprising disregarding the second pressure drop if the calculated rate-of-change is greater than the rate-of-change threshold.

3. The method of claim 1, wherein the rate-of-change threshold is an increasing function of the exhaust flow rate.

4. The method of claim 1, wherein determining a rate-of-change threshold from the sensed exhaust flow rate includes retrieving a rate-of-change threshold value from a look-up table, the rate-of-change threshold value corresponding to the sensed flow rate, and increasing as a function of the sensed flow rate.

5. A system, comprising:
   an engine of a vehicle;
   an exhaust aftertreatment device, including a particulate filter, in fluid communication with the engine of the vehicle;
   a monitoring system comprising:
      a first fluid tube disposed, in fluid communication with the exhaust aftertreatment device, between the particulate filter and the engine;
      a second fluid tube disposed, in fluid communication with the exhaust aftertreatment device, on an opposite side of the particulate filter from the first fluid tube;
      a differential pressure sensor configured to monitor a pressure drop between the first fluid tube and the second fluid tube; and
      a controller in communication with the differential pressure sensor and configured to:
         receive a first pressure drop, sensed by the differential pressure module across the particulate filter, at a first instant in time;
         receive a second pressure drop, sensed by the differential pressure module across the particulate filter, at a second instant in time;
         calculate a rate-of-change of the pressure drop between the first instant in time and the second instant in time;
         receive a flow rate of an exhaust gas flowing through the exhaust aftertreatment device;
         determine a rate-of-change threshold from the received exhaust flow rate; compare the calculated rate-of-change to the rate-of-change threshold; and
         update a soot model using the sensed second pressure drop if the calculated rate-of-change is less than the rate-of-change threshold;
         initiate a regeneration of the particulate filter if an amount of soot, as determined by the soot model, exceeds a soot threshold, wherein the controller initiates a regeneration by increasing an amount of fuel provided to an engine coupled with the exhaust aftertreatment device.

6. The system of claim 5, further comprising a flow rate sensor in communication with the controller and configured to monitor a flow rate of an exhaust gas flowing through the exhaust aftertreatment device.

7. The system of claim 5, wherein the controller is further configured to disregard the second pressure drop if the calculated rate-of-change is greater than the rate-of-change threshold.

8. The system of claim 5, wherein the rate-of-change threshold is an increasing function of the exhaust flow rate.

9. The system of claim 5, wherein the controller includes a look-up table; and
   wherein the controller is configured to determine a rate-of-change threshold from the sensed exhaust flow rate by referencing the stored look-up table.

10. A method of regenerating a particulate filter of an exhaust aftertreatment device comprising:
   sensing a first pressure drop across the particulate filter at a first instant in time via a pressure sensor;
   sensing a second pressure drop across the particulate filter at a second instant in time via the pressure sensor, wherein the first instant in time and the second instant in time are from 0.5 to 60 seconds apart;

calculating a rate-of-change of the pressure drop between the first instant in time and the second instant in time using a controller in communication with the pressure sensor;

sensing a flow rate of an exhaust gas flowing through the exhaust aftertreatment device;

retrieving a rate-of-change threshold value from a look-up table, the rate-of-change threshold value corresponding to the sensed flow rate, and increasing as a function of the sensed flow rate;

comparing the calculated rate-of-change to the rate-of-change threshold value;

updating a soot model maintained by the controller using the sensed second pressure drop if the calculated rate-of-change is less than the rate-of-change threshold; and regenerating of the particulate if an amount of soot, as determined by the soot model, exceeds a soot threshold, wherein the regenerating includes burning the soot off the particulate filter by heating the particulate filter via increasing an amount of fuel provided to an engine.

11. The method of claim 10, further comprising disregarding the second pressure drop if the calculated rate-of-change is greater than the rate-of-change threshold value.

* * * * *